(No Model.)
W. D. LINDSLEY.
Corn Planting Attachment for Sulky Plows.
No. 243,276.        Patented June 21, 1881.
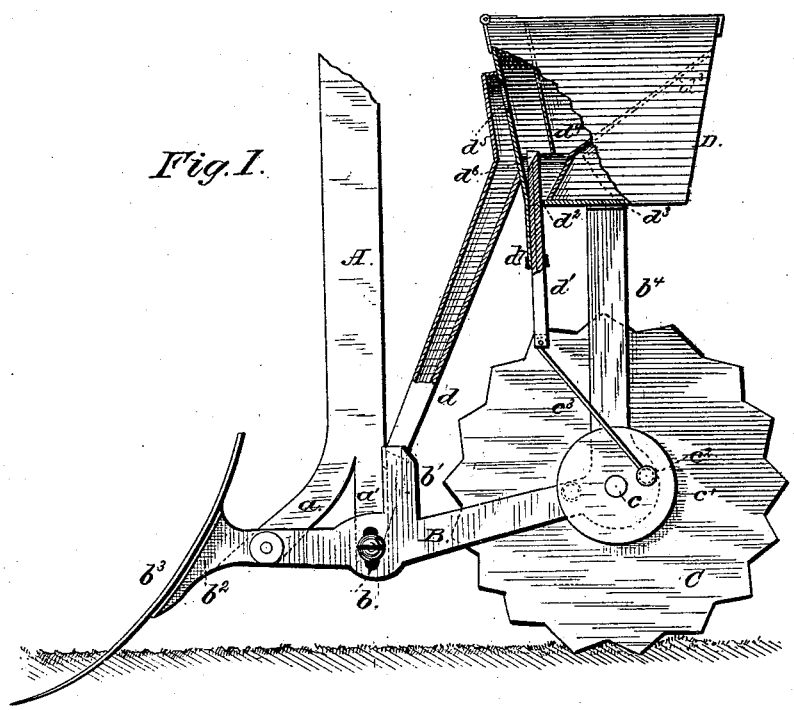
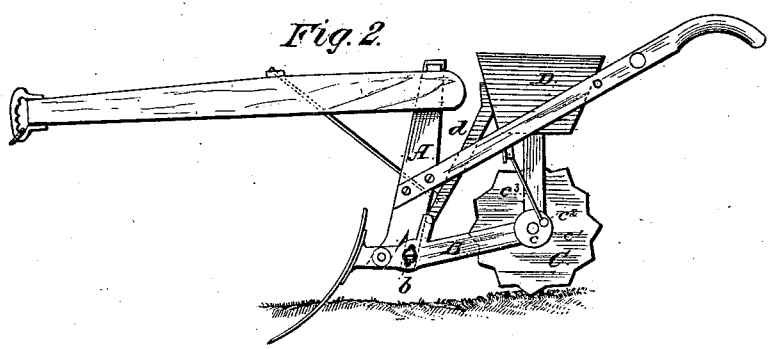
WITNESSES:
INVENTOR:
Wm. D. Lindsley
BY
ATTORNEYS.

UNITED STATES PATENT OFFICE.

WILLIAM D. LINDSLEY, OF STERLING, ASSIGNOR TO HIMSELF AND E. V. SNIVELY, OF WATHENA, KANSAS.

CORN-PLANTING ATTACHMENT FOR SULKY-PLOWS.

SPECIFICATION forming part of Letters Patent No. 243,276, dated June 21, 1881.

Application filed January 10, 1881. (No model.)

*To all whom it may concern:*

Be it known that I, WILLIAM D. LINDSLEY, a citizen of the United States, residing at Sterling, in the county of Rice and State of Kansas, have invented a new and useful Corn-Planter, of which the following is a full, clear, and exact description, reference being had to the drawings hereto annexed.

The object of my invention is to provide a simple and inexpensive device for planting corn and other grain at any desired depth, which may be conveniently attached to any sulky-plow, or provided with handles and suitable beam and used as a walking-planter.

To this end my invention consists in a wheel attached to the rear of a shovel-plow, and provided with suitable mechanism for driving the dropping device, which is supported above said wheel in a peculiar manner, as hereinafter more fully described.

In the accompanying drawings, Figure 1 represents a side elevation, partly sectional, of my invention as adapted for being attached to a sulky-plow; and Fig. 2, the same as a walking-planter.

A represents an upright beam of a plow having toe $a$ and heel $a'$, to which are attached, by means of bolts and nuts, the two parallel longitudinal bars B B, having corresponding vertical slots, $b$, for adjusting the plow at different angles, for the purpose of securing desired pressure on the wheel, and provided with guides $b'$ for holding the end of spout $d$ in position, and to secure open passage for grain to bottom of the furrow. The forward ends of said bars are provided with outwardly-inclining flanges $b^2$, to which the shovel $b^3$ is attached, while the rear ends furnish bearings for the notched driving wheel or disk C, which is rigidly secured upon a shaft, $c$. Upon the outer ends of said shaft are rigidly secured disks $c'$, each having a pivot or wrist, $c^2$, upon its outer surface, near the edge, so arranged with respect to each other that when one wrist is at the top the other will be at the bottom of its disk, respectively. To said wrists are attached driving-rods $c^3$, the opposite ends of which are pivoted to slides $d'$, passing up through the forward end of the hopper D. Said hopper is supported above the driving-wheel upon the two parallel vertical bars $b^4$, attached to the rear ends of bars B, and is provided with two laterally-arranged funnel-shaped apertures, $d^2$, in the forward end of its bottom, through which the vertical slides $d'$ move to drop the corn. This hopper is provided with a bottom, $d^3$, inclining downward to its forward end, for the purpose of running the corn into the funnels, and a vertical partition, $d^4$, arranged above said funnels and parallel to the forward end of said hopper, for the purpose of preventing the corn from coming in contact with the openings $d^5$ in the forward end of the hopper, through which the corn falls into the spout $d$ when lifted by the slides $d'$, which move against the forward end of the hopper. These slides are provided at their upper ends with longitudinal slots $d^6$, to form cups for lifting the corn, and so constructed that when they rise to the holes $d^5$ the corn will slide down through the slots and out at the holes into the spout, which is attached to the outer side of the forward end of the hopper and extends down to the furrow just behind the plow. The forward end of said hopper is provided with a downward-projecting apron having guides $d^7$ for holding said slides in a vertical position. It will be seen that the slides rise and fall alternately, making two hills to each revolution of the driving-wheel.

The shovel $b^3$ is so constructed that the soil will fall back and fill up the furrow, thereby covering the grain.

What I claim as new, and desire to secure by Letters Patent, is—

1. A corn-planter consisting in a foot-shaped beam pivoted at the toe and adjusted at the heel to two parallel bars supported upon a serrated driving-wheel, in combination with two vertical slides having slotted ends for lifting the corn to openings in the side of the hopper, substantially as shown and described, and for the purpose set forth.

2. In a corn-planter, the two rectangular parallel bars B B, carrying a shovel, $b^3$, on their forward ends, and a hopper on their rear or upper ends, and provided with slots $b$ and guides $b'$, substantially as shown and described.

WILLIAM DARWIN LINDSLEY.

Witnesses:
J. H. SMITH,
M. C. BRADY.